(12) United States Patent
Drehman

(10) Patent No.: US 7,318,948 B1
(45) Date of Patent: *Jan. 15, 2008

(54) LIGHT TRANSMISSIVE FILMS

(75) Inventor: Alvin J. Drehman, Chelmsford, MA (US)

(73) Assignee: United States of America as represented by the Secretary of the Air Force, Washington, DC (US)

(*) Notice: Subject to any disclaimer, the term of this patent is extended or adjusted under 35 U.S.C. 154(b) by 527 days.

This patent is subject to a terminal disclaimer.

(21) Appl. No.: 10/914,019

(22) Filed: Aug. 9, 2004

Related U.S. Application Data

(62) Division of application No. 10/134,997, filed on Apr. 30, 2002, now abandoned.

(51) Int. Cl.
*B05D 5/06* (2006.01)
(52) U.S. Cl. ............ 427/162; 427/164; 427/167; 428/423
(58) Field of Classification Search ............ 427/162, 427/164, 167; 428/423
See application file for complete search history.

(56) References Cited

U.S. PATENT DOCUMENTS

| 4,415,602 | A | * | 11/1983 | Brodie et al. | ............ 427/576 |
| 4,939,043 | A | * | 7/1990 | Biricik et al. | ............ 428/620 |
| 5,236,632 | A | * | 8/1993 | Ogawa et al. | ............ 252/519.5 |
| 5,324,365 | A | * | 6/1994 | Niwa | ............ 136/256 |

\* cited by examiner

*Primary Examiner*—Alain L. Bashore
(74) *Attorney, Agent, or Firm*—AFMCLO/JAZ; Thomas C. Stover

(57) ABSTRACT

A thin film of zinc oxide is deposited by sputter deposition in a partial pressure of oxygen on a suitable at a low temperature, such as less than 300 degrees Centigrade, to provide an amorphous film. This should take place in a sputtering environment which will produce an oxygen deficient film layer. After this, the film is crystallized by heat treatment in an oxygen free environment in a given temperature range. The thin film produced by this process will have very low electrical resistance, is transparent from about the visible to beyond 10 microns in wavelength, is highly resistant to laser energy and is highly conductive.

10 Claims, 1 Drawing Sheet

LIGHT TRANSMISSIVE FILMS

RELATED APPLICATIONS

This application is a refile of an application Ser. No. 09/566,366, filed on 8 May 2000, entitled *Method of Making High Conductivity I-R Transparent Zinc Oxide Films and Films Therefrom*, by the same inventors, now abandoned.

This Application is a Divisional of co-pending application, Ser. No. 10/134,997, filed on 30 Apr. 2002 now abandoned, having the same title.

STATEMENT OF GOVERNMENT INTEREST

The invention described herein may be manufactured and used by or for the Government for governmental purposes without the payment of any royalty thereon.

FIELD OF THE INVENTION

This invention relates to light transmissive films, particularly those that are electrically conductive.

BACKGROUND OF THE INVENTION

In order to direct laser energy in the I-R range, electrodes in these devices must be transparent. For example, in an article in Applied Physics Letters, vol. 67, p 2246 (1995), Phillips et al show that zinc indium oxide (ZIO) can be grown as a thin film by the use of the pulsed laser deposition techniques and by dc reactive sputtering. The optical transmission characteristics of such film is significantly better than other transparent conducting oxides and has a conductivity approaching that of indium-tin-oxide (ITO). ZIO is noted for its superior transmission in the 1 to 1.5 micron range and is thus desirable for use in infrared devices where transparent electrodes are essential.

Thus, there exists a need and market for a thin film material which is both highly conductive and transparent from visible to wavelengths beyond 10 microns. There has now been discovered films that meet this need.

SUMMARY OF THE INVENTION

Broadly, the invention provides a light transmissive film comprising, a crystalline oxygen deficient film, having zinc oxide and being transparent from about the visible to a wavelength beyond 10 microns, the film being electrically conductive and resistant to laser radiation.

The invention also provides a method for preparing such films. For example, a thin film of zinc oxide is deposited by sputter deposition using conventional sputter gases such as argon, and in a partial pressure of oxygen such as from about 0% to about 20%, on a suitable substrate at a low temperature such as at less than 300 degrees Centigrade to provide an amorphous or high defect density film. This should take place in a sputtering environment which will produce an oxygen deficient film layer. After this, the film is crystallized or recrystallized by heat treatment in an oxygen free environment in a given temperature range. The thin film produced by this process will have low electrical resistance, be transparent from about the visible to beyond 10 microns in wavelength, be highly resistant (and transmissive) to laser energy, and be highly conductive.

Therefore, one object of the present invention is to provide a thin film of transparent material which is highly conductive.

Another object of the present invention is to provide a thin film of transparent material which is highly conductive and is resistant to damage by a high flux of phonons, i.e., laser-hard.

Another of object of the present invention is to provide a thin film of transparent material which is highly conductive, laser-hard and can be used in steering I-R laser beams.

Another object of the present invention is to provide an oxygen deficient film which is highly conductive.

These and many other objects and advantages of the present invention will be ready apparent to those skilled in the pertinent art from the following detailed description of a preferred embodiment of the invention and the related drawings.

DETAILED DESCRIPTION OF THE INVENTION

Figure 1:
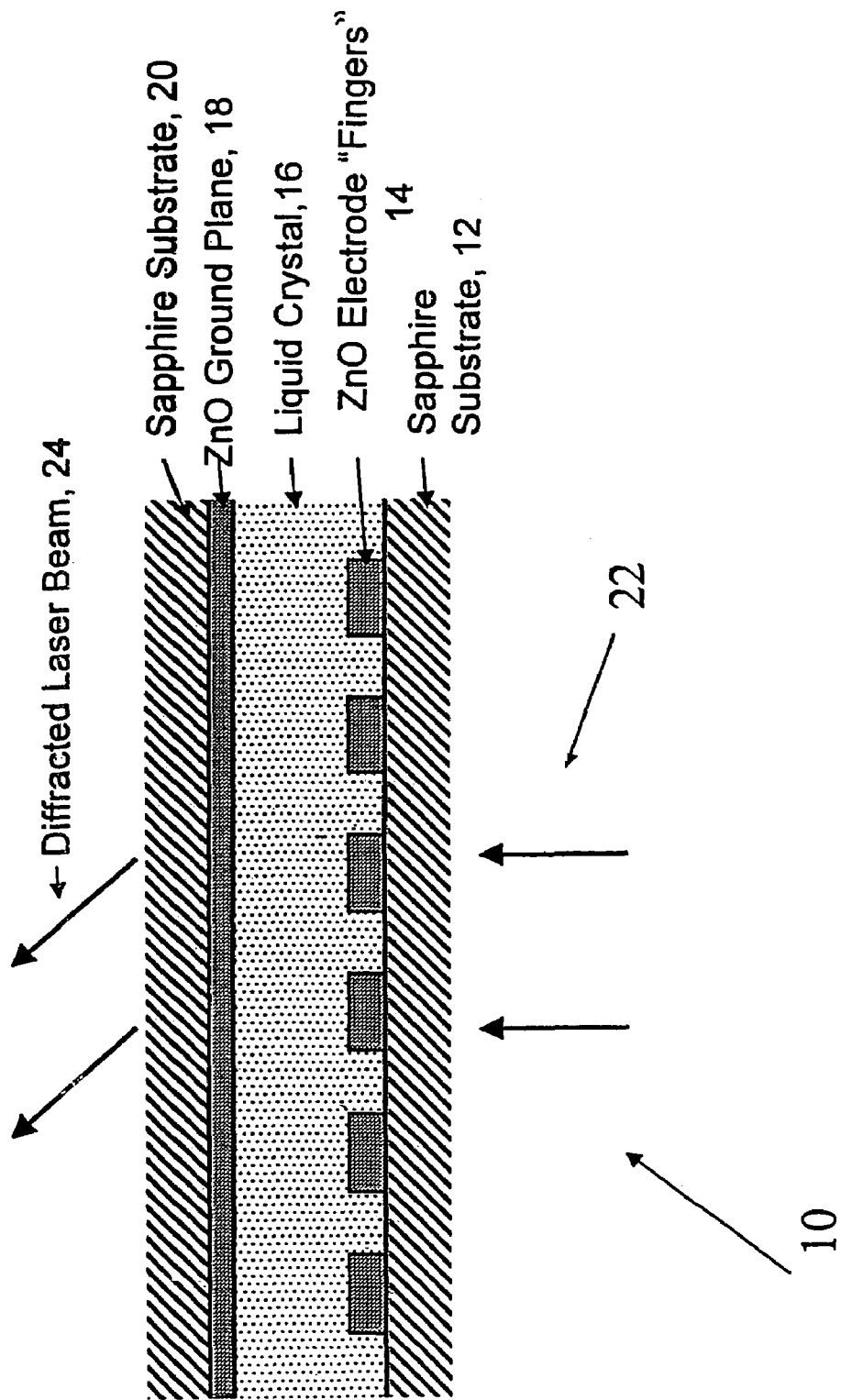
FIG. 1 illustrates, in cross section, a device that uses the thin film of the present invention.

Referring to FIG. 1, an I-R beam steering device 10 is shown in cross section. An input laser beam 22 passes through a transparent substrate 12 having formed thereon a plurality of parallel electrodes 14, i.e., finger, of highly conductive and transparent material such as provided by the present invention. By the appropriate application of voltages thereto, a grating like device may be formed in the liquid crystal material 16 attached thereover which allows for the steering of a diffracted laser beam 24. Attached over the liquid crystal material 16 is a thin film of the present inventive material 18 with a protective layer 20 thereon.

A layer of ZnO is deposited by sputter deposition using a conventional apparatus onto a substrate such as sapphire, silicon, fused silica, etc., at a low temperature, typically less than 300 degrees Centigrade, to ensure that it is deposited in an amorphous, or a high defect density state. This can be accomplished by either an on-axis or off-axis sputter deposition process. The temperature of the substrate during deposition must be adequately low to prevent in situ crystalline growth, and this temperature is dependent upon the sputter power and the proximity of the sputter source to the substrate. An unheated substrate works well over a wide range of deposition conditions. While one object of this deposition is to make an oxygen deficient, amorphous ZnO film, it is found that the presence of oxygen in the sputter gas (typically argon, but other gases can be used such as nitrogen, neon, krypton, etc.) still permits oxygen deficient deposition and helps to prevent degradation of the sputter source material.

The ZnO film is then subsequently crystallized, or recrystallized, by heat treating in an oxygen free environment, such as in a vacuum or in nitrogen, or in forming gas (nitrogen or argon with a few percent hydrogen), etc. For the ZnO film without the addition of other elements, a temperature of from about 350 to about 550 degrees Centigrade results in films with the lowest resistance. This process turns the ZnO into an n-type semiconductor. The use of dopants may be used to further lower the resistance.

It is also found that epitaxial, in situ grown ZnO films, when given this same type of heat treatment will exhibit a drastically reduced resistance, although not quite as low as that obtained in films deposited by the above process.

Other oxides such as indium oxide, indium-tin oxide, gallium oxide, aluminum oxide, etc. can be added to or alloyed with ZnO. Other elements can be added interstitally or by substituting on the oxygen site of ZnO or on the other material noted above, with elements such as nitrogen, phosphorus, arsenic, etc.

Other oxide films such as magnesium oxide, barium titanate, strontium titanante, gallium oxide, indium, etc., can be added to or alloyed with ZnO.

The film of ZnO so produced by the above process is highly conductive with a resistivity of $10^{-2}$ to $10^{-4}$ ohm-cm. Further, films of ZnO produced by the process are laser hard and are undamaged by laser pulses of 2.4 J/cm$^2$ at a wavelength of 1.06 microns.

The films produced by this process can be used to make thin films which can be used in electro-optic applications such as transparent electrodes, transparent ground planes, etc.

Clearly many modifications and variations of the present invention are possible in light of the above teachings and it is therefore understood, that within the iscope of the inventive concept, the invention may be practiced otherwise than specifically claimed.

The invention claimed is:

1. A method of making a crystalline oxygen deficient film of oxide material, said film being transparent from about the visible to a wavelength beyond 10 microns, said film being conductive and resistant to laser radiation comprising the steps of:
   depositing an oxide material on a substrate at a deposition temperature that is low enough to prevent in situ crystalline growth of said material in an oxygen deficient atmosphere and
   heat treating said oxide material in a temperature range of 350-550° C., to crystallize said oxide material in an essentially oxygen free environment and form said film.

2. The method of claim 1 wherein said oxide material is selected from the group consisting of zinc oxide, magnesium oxide, gallium oxide, indium oxide, barium titanate, strontium titanate and a combination thereof.

3. The method of claim 1 further including depositing said film upon said substrate which is selected from the group consisting of sapphire, silicon and fused silica, said substrate being substantially transparent as said oxide material.

4. The method of claim 1 wherein said film has a resistivity of from about $10^{-2}$ to about $10^{-4}$ ohm-cm and is undamaged by laser pulses of up to about 2.4 J/cm$^2$.

5. The method of claim 4 wherein said laser pulses have wavelengths of about 1 microns.

6. The method of claim 1 further including adding dopants such as nitrogen, phosphorus, or arsenic.

7. The method of claim 1 further including the addition of other oxide materials selected from the group consisting of indium oxide, indium-tin oxide, gallium oxide and aluminum oxide.

8. The method of claim 1 wherein said depositing occurs by sputter deposition.

9. The method of claim 1 wherein said predetermined low temperature is less than about 300 degrees Centigrade.

10. The method of claim 1 wherein said substrate is unheated.

* * * * *